(12) United States Patent
Sun

(10) Patent No.: US 9,409,215 B2
(45) Date of Patent: Aug. 9, 2016

(54) METHOD FOR CLEANSING GLASS SUBSTRATE AND DEVICE FOR PERFORMING THE METHOD

(71) Applicant: Shenzhen China Star Optoelectronics Technology Co., Ltd., Shenzhen, Guangdong (CN)

(72) Inventor: Shihying Sun, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 306 days.

(21) Appl. No.: 14/111,560

(22) PCT Filed: Jul. 26, 2013

(86) PCT No.: PCT/CN2013/080233
§ 371 (c)(1),
(2) Date: Oct. 13, 2013

(87) PCT Pub. No.: WO2015/010340
PCT Pub. Date: Jan. 29, 2015

(65) Prior Publication Data
US 2015/0027490 A1 Jan. 29, 2015

(30) Foreign Application Priority Data
Jul. 24, 2013 (CN) .......................... 2013 1 0314174

(51) Int. Cl.
*B08B 11/04* (2006.01)
*B08B 7/04* (2006.01)
*A47L 5/14* (2006.01)
*B08B 5/02* (2006.01)
*B08B 7/02* (2006.01)
*B08B 15/04* (2006.01)
*C03C 23/00* (2006.01)

(52) U.S. Cl.
CPC . *B08B 11/04* (2013.01); *A47L 5/14* (2013.01); *B08B 5/02* (2013.01); *B08B 7/028* (2013.01); *B08B 7/04* (2013.01); *B08B 15/04* (2013.01); *C03C 23/0075* (2013.01)

(58) Field of Classification Search
CPC ............ B08B 5/02; B08B 5/04; B08B 11/04; B08B 7/04; B08B 7/028; B08B 15/00; B08B 15/04; B08B 2205/00; B08B 2205/005; B08B 2215/003; A47L 5/14; A47L 9/02
USPC ............... 134/1, 21; 15/345, 347, 300.1, 330, 15/306.1, 309.1, 309.2
See application file for complete search history.

(56) References Cited

U.S. PATENT DOCUMENTS 5,457,847 A * 10/1995 Uzawa ..................... B08B 5/026
15/306.1
5,464,474 A * 11/1995 Nishimoto .............. B08B 1/007
118/104
6,474,355 B1 11/2002 Jirawat et al.

FOREIGN PATENT DOCUMENTS

CN  101143365 A  3/2008
CN  101195435 A  6/2008
(Continued)

*Primary Examiner* — Saeed T Chaudhry
(74) *Attorney, Agent, or Firm* — Andrew C. Cheng

(57) ABSTRACT

The present invention provides a method for cleansing a glass substrate and a device for performing the method. The method includes: (1) providing a transport platform (20) and a glass substrate to be cleansed (40); (2) placing a glass substrate to be cleansed (40) on the transport platform (20); (3) providing two air blowing devices (60); (4) the two air blowing devices (60) blowing air flows toward the lass substrate to be cleansed (40) to have impurities (42) that are attached to the glass substrate to be cleansed (40) detached from the glass substrate (40); (5) providing a suction device (80), the suction device (80) comprising an air drawing device (82) and a magnetic attraction device (84); (6) the air drawing device (82) drawing air from the glass substrate to be cleansed (40) and the magnetic attraction device (84) generating a magnetic attraction force to magnetic impurities on the glass substrate to be cleansed (40) so as to draw the impurities (42) attached to the glass substrate to be cleansed (40) into the suction device (80).

10 Claims, 4 Drawing Sheets

(56) References Cited

FOREIGN PATENT DOCUMENTS

| | | |
|---|---|---|
| CN | 202336465 U | 7/2012 |
| CN | 102673905 A | 9/2012 |
| CN | 102679696 A | 9/2012 |
| JP | 2001021899 A | 1/2001 |

* cited by examiner

1 providing a transport platform and a glass substrate to be cleansed, the glass substrate to be cleansed having impurities attached thereto, the impurities comprising magnetic impurities and non-magnetic impurities

2 placing the glass substrate to be cleansed on the transport platform

3 providing two air blowing devices, the two air blowing devices being spaced from each other and arranged above the transport platform

4 the two air blowing devices blowing air flows toward the glass substrate to be cleansed to have the impurities that are attached to the glass substrate to be cleansed to detach from the glass substrate

5 providing a suction device, wherein the suction device comprises an air drawing device and a magnetic attraction device, the air drawing device comprising an air drawing opening arranged between the two air blowing devices, the magnetic attraction device being arranged in the air drawing opening of the air drawing device

6 the air drawing device drawing air from the glass substrate to be cleansed and the magnetic attraction device generating a magnetic attraction force to the magnetic impurities on the glass substrate to be cleansed so as to draw the impurities attached to the glass substrate to be cleansed into the suction device

Fig. 3

METHOD FOR CLEANSING GLASS SUBSTRATE AND DEVICE FOR PERFORMING THE METHOD

BACKGROUND OF THE INVENTION

1. Field of the Invention

The present invention relates to a cleansing method, and in particular to a method for cleansing a glass substrate and a device for performing the method.

2. The Related Arts

Liquid crystal displays have a variety of advantages, such as thin device body, low power consumption, and being free of radiation, and are thus widely used. Most of the liquid crystal displays that are currently available in the market are backlighting liquid crystal displays, which comprise a liquid crystal display panel and a backlight module. The operation principle of the liquid crystal display panel is that, with liquid crystal molecules interposed between two parallel glass substrates, electricity is selectively applied circuits of the glass substrates to control the liquid crystal molecules to change direction so as to refract out light emitting from the backlight module for generating images.

During the process of manufacturing a liquid crystal display panel, it is often that impurities may get left on the glass substrates, leading to defects of bright spots or bright lines appearing on the liquid crystal display panel so as to affect the displaying performance.

A commonly used glass substrate cleansing device is a dry cleansing machine. Referring to FIG. 1, the dry cleansing machine comprises: a transport platform 100 for carrying and transporting a glass substrate, two air blowing devices 300 arranged above the transport platform 100, and an air drawing device 500 arranged above the transport platform 100. The air drawing device 500 comprises an air drawing port 502 and an impurity storage section 504 in communication with the air drawing port 502. The air drawing port 502 is located between the two air blowing devices 300 and the impurity storage section 504 is located above the two air blowing devices 300, wherein the two air blowing devices 300 are each provided with an ultrasonic wave generator 302 for emitting an ultrasonic wave to a surface of a glass substrate 700 so as to cause the impurities that are attached to the surface to vibrate and thus detach from the glass substrate 700. Meanwhile, the air drawing device 500 proceeds with air drawing on the impurities 702 to suck the impurities 702 into the air drawing device 500 and stored in the impurity storage section 504 thereby realizing impurity cleansing of the surface of the glass substrate 700.

However, as shown in FIG. 2, when the impurities 702 include large particles of metallic impurity, since the impurities 702 are of a great weight, it might be impossible for the impurities 702 to be drawn into the air drawing device 500 and this results in incomplete cleansing of the glass substrate 700, thereby affecting the displaying performance of a liquid crystal display panel formed of the specific glass substrate 700.

SUMMARY OF THE INVENTION

An object of the present invention is to provide a method for cleansing a glass substrate, which effectively removes impurities left on a surface of the glass substrate and shows a prominent effect of impurity removal effect for magnetic impurities.

Another object of the present invention is to provide a glass substrate cleansing device, which has a simple structure and shows an excellent effect of impurity removal for magnetic impurities.

To achieve the objects, the present invention provides a method for cleansing a glass substrate, which comprises the following steps:

(1) providing a transport platform and a glass substrate to be cleansed, the glass substrate to be cleansed having impurities attached thereto, the impurities comprising magnetic impurities and non-magnetic impurities;

(2) placing the glass substrate to be cleansed on the transport platform;

(3) providing two air blowing devices, the two air blowing devices being spaced from each other and arranged above the transport platform;

(4) the two air blowing devices blowing air flows toward the glass substrate to be cleansed to have the impurities that are attached to the glass substrate to be cleansed to detach from the glass substrate;

(5) providing a suction device, wherein the suction device comprises an air drawing device and a magnetic attraction device, the air drawing device comprising an air drawing opening arranged between the two air blowing devices, the magnetic attraction device being arranged in the air drawing opening of the air drawing device; and (6) the air drawing device drawing air from the glass substrate to be cleansed and the magnetic attraction device generating a magnetic attraction force to the magnetic impurities on the glass substrate to be cleansed so as to draw the impurities attached to the glass substrate to be cleansed into the suction device.

Each of the air blowing devices comprises an ultrasonic wave generator mounted therein. The two ultrasonic wave generators mounted in the two air blowing devices emit ultrasonic waves that are inclined with respect to each other and converge on the glass substrate to be cleansed. The ultrasonic wave generators operate at a frequency of 30 K-100 K Hz.

The air drawing device comprises an impurity storage section that is in communication with the air drawing opening and an air evacuation device arranged at an end of the impurity storage section that is distant from the air drawing opening.

The air evacuation device and the impurity storage section comprise a separation screen arranged therebetween.

The magnetic attraction device comprises a bar-like electric magnet.

The present invention further provides a glass substrate cleansing device, which comprises: a chassis, a transport platform mounted on the chassis, two spaced air blowing devices mounted on the chassis and located above the transport platform, and a suction device mounted on the chassis. The suction device comprises an air drawing device and a magnetic attraction device. The air drawing device comprises an air drawing opening arranged between the two air blowing devices. The magnetic attraction device is arranged in the air drawing opening of the air drawing device.

Each of the air blowing devices comprises an ultrasonic wave generator mounted therein. The two ultrasonic wave generators mounted in the two air blowing devices emit ultrasonic waves that are inclined with respect to each other and converge on the glass substrate to be cleansed. The ultrasonic wave generators operate at a frequency of 30 K-100 K Hz.

The air drawing device comprises an impurity storage section that is in communication with the air drawing opening and an air evacuation device arranged at an end of the impurity storage section that is distant from the air drawing opening.

The air evacuation device and the impurity storage section comprise a separation screen arranged therebetween.

The magnetic attraction device comprises a bar-like electric magnet.

The present invention further provides a glass substrate cleansing device, which comprises: a chassis, a transport platform mounted on the chassis, two spaced air blowing devices mounted on the chassis and located above the transport platform, and a suction device mounted on the chassis, the suction device comprising an air drawing device and a magnetic attraction device, the air drawing device comprising an air drawing opening arranged between the two air blowing devices, the magnetic attraction device being arranged in the air drawing opening of the air drawing device;

wherein each of the air blowing devices comprises an ultrasonic wave generator mounted therein, the two ultrasonic wave generators mounted in the two air blowing devices emitting ultrasonic waves that are inclined with respect to each other and converge on the glass substrate to be cleansed, the ultrasonic wave generators operating at a frequency of 30 K-100 K Hz; and wherein the air drawing device comprises an impurity storage section that is in communication with the air drawing opening and an air evacuation device arranged at an end of the impurity storage section that is distant from the air drawing opening.

The air evacuation device and the impurity storage section comprise a separation screen arranged therebetween.

The magnetic attraction device comprises a bar-like electric magnet.

The efficacy of the present invention is that the present invention provides a method for cleansing a glass substrate and a device for performing the method, wherein a magnetic attraction device is arranged in an air drawing opening of an air drawing device to operate collaboratively with the air drawing device to accomplish effective removal of magnetic impurities and thus overcome the drawback of the conventional cleansing device that is of inferior capability of removing magnetic impurities that are great weights from a glass substrate and avoid defects of a liquid crystal display panel that uses the glass substrate resulting therefrom, such as bright spots and bright lines so as to effectively improve the quality of the liquid crystal display panel.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings:

FIG. 3 is a flow chart illustrating a method for cleansing a glass substrate according to the present invention.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
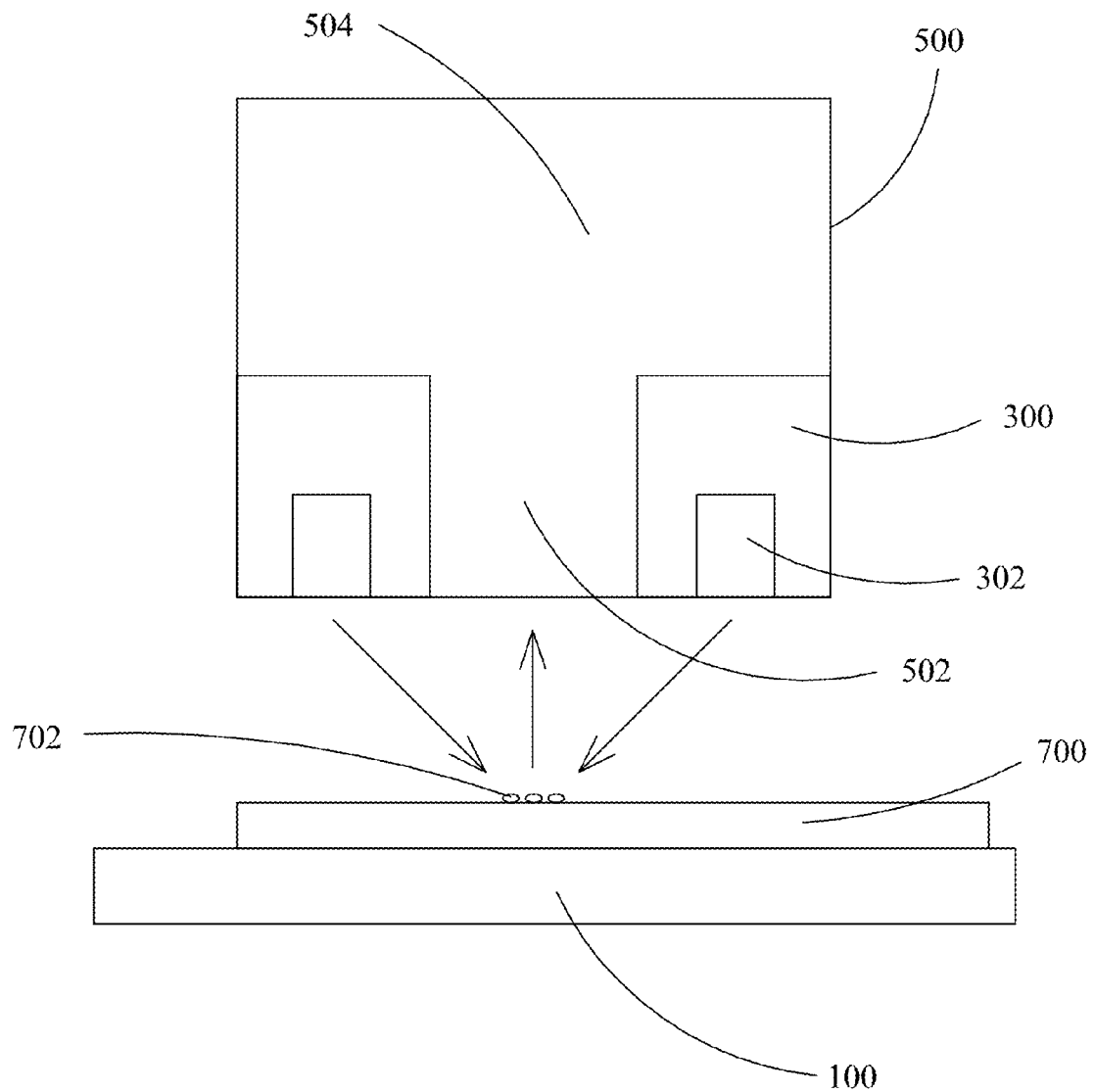
FIG. 1 is a simplified schematic view showing a conventional glass substrate cleansing device.
Figure 2:
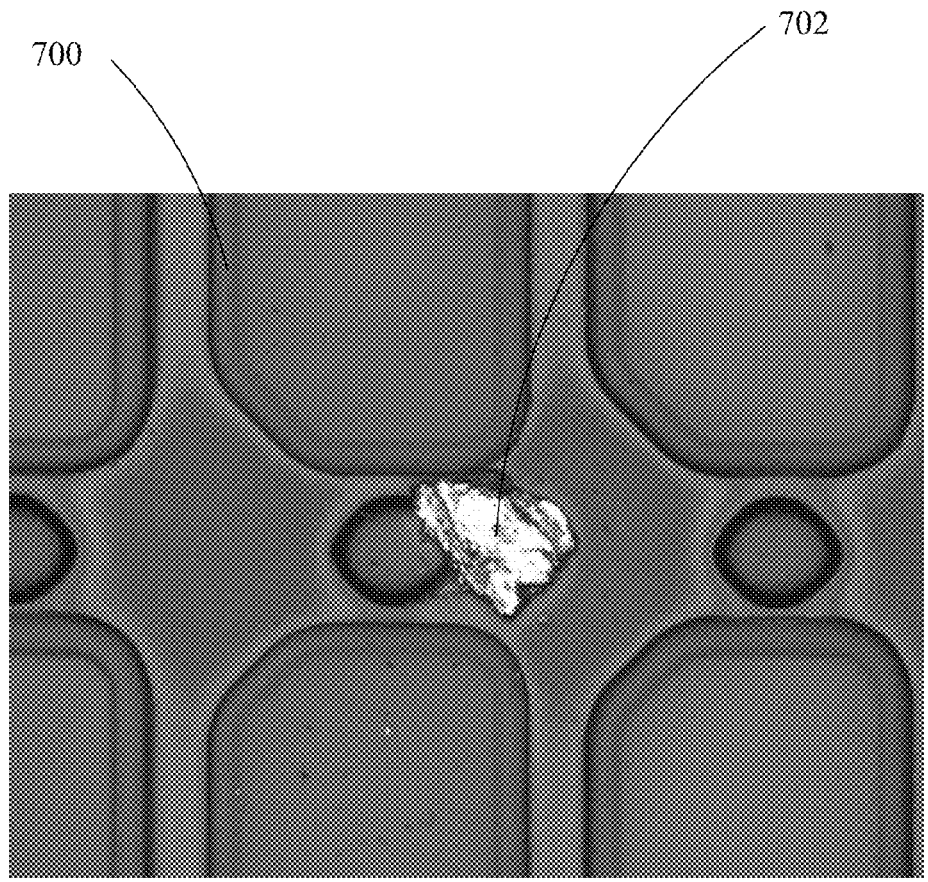
FIG. 2 is a schematic plan view illustrating a large-sized metallic impurity attached to a glass substrate.
Figure 4:
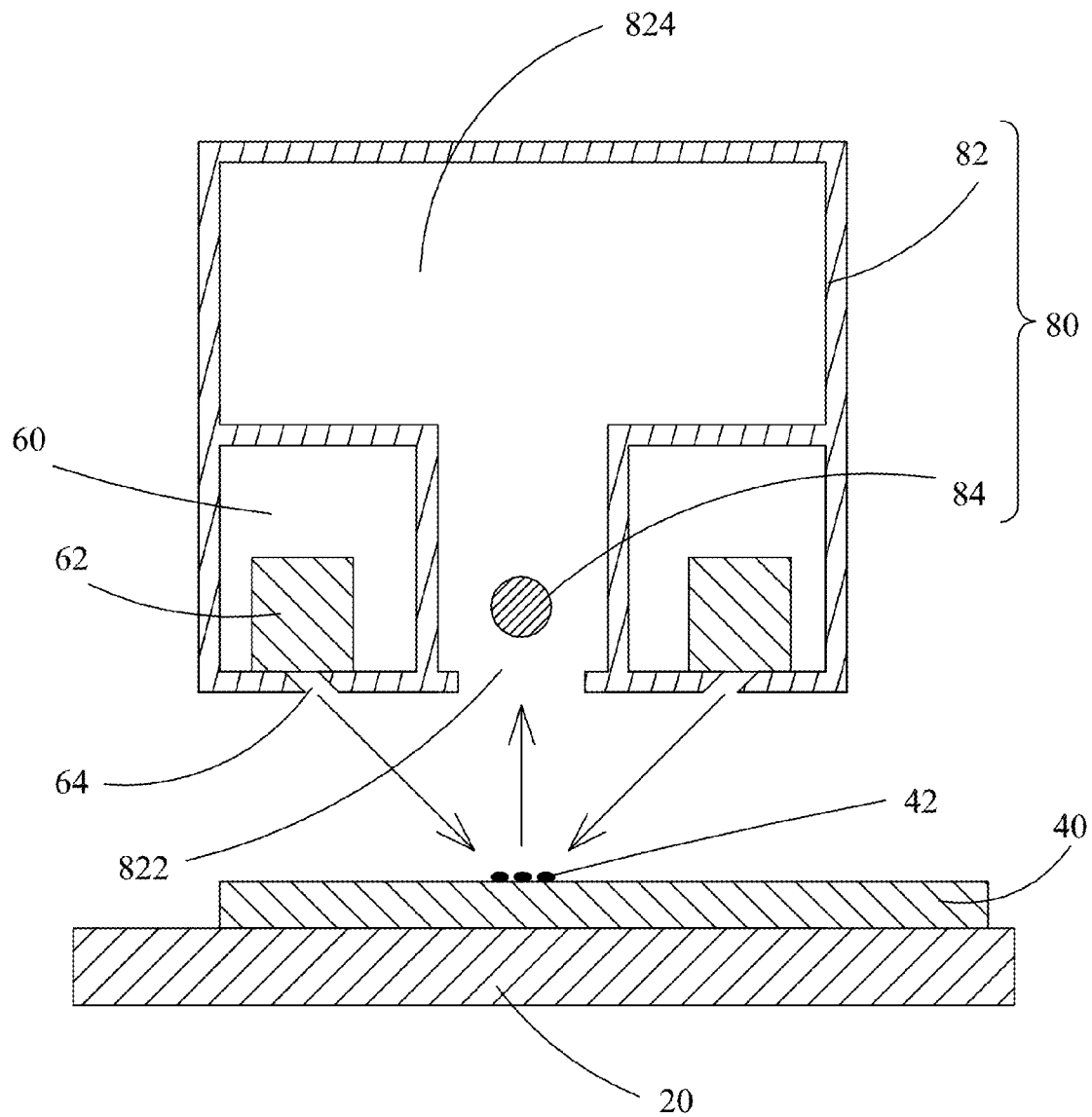
FIG. 4 is a simplified schematic view showing a glass substrate cleansing device according to the present invention.

Referring to FIGS. 3 and 4, the present invention provides a method for cleansing a glass substrate, which comprises the following steps:

Step 1: providing a transport platform 20 and a glass substrate to be cleansed 40, the glass substrate to be cleansed 40 having impurities 42 attached thereto, the impurities 42 comprising magnetic impurities and non-magnetic impurities.

Step 2: placing the glass substrate to be cleansed 40 on the transport platform 20.

Step 3: providing two air blowing devices 60, the two air blowing devices 60 being spaced from each other and arranged above the transport platform 20.

Preferably, each of the air blowing devices 60 comprises an ultrasonic wave generator mounted therein.

Step 4: the two air blowing devices 60 blowing air flows to the glass substrate to be cleansed 40 to have the impurities 42 that are attached to the glass substrate to be cleansed 40 to detach from the glass substrate 40. The two ultrasonic wave generators 62 mounted in the two air blowing devices 60 emit ultrasonic waves that are inclined with respect to each other (as indicated by the arrows pointing to the glass substrate shown in FIG. 4) and converge on the glass substrate to be cleansed 40. The impurities 42 are subjected to vibration caused by ultrasonic-waved air flows from two directions and thus separated from the glass substrate 40. In the instant embodiment, the ultrasonic wave generators 62 operate at a frequency of 30 K-100 K Hz.

Specifically, each of the air blowing devices 60 comprises an air blowing opening 64 and two air blowing openings 64 of the two air blowing devices 60 are arranged to be inclined with respect each other so that the air flow directions of the two air blowing openings 64 (as indicated by the arrows pointing to the glass substrate shown in FIG. 4) define a predetermined included angle therebetween. The two air blowing devices 60 blows air flows through the air blowing openings 64 toward the glass substrate to be cleansed 40. The two ultrasonic wave generators 62 generate ultrasonic waves to have the air flows blown out of the air blowing openings 64 inducing vibration at the same vibration frequency as that of the ultrasonic waves. The vibrations are transmitted and applied to the impurities 42 to cause the impurities 42 to vibrate and separate from the glass substrate 40.

Step 5: providing a suction device 80, wherein the suction device 80 comprises an air drawing device 82 and a magnetic attraction device 84, the air drawing device 82 comprising an air drawing opening 822 arranged between the two air blowing devices 60, the magnetic attraction device 84 being arranged in the air drawing opening 822 of the air drawing device 82.

It is noted that the air drawing device 82 may further comprise an impurity storage section 824 that is in communication with the air drawing opening 822 and an air evacuation device (not shown) arranged at an end of the impurity storage section 824 that is distant from the air drawing opening 822. A separation screen (not shown) is arranged between the air evacuation device and the impurity storage section 824 to prevent the impurities from entering the air evacuation device to affect the service life of the air evacuation device.

The magnetic attraction device 84 can be a magnet or an electromagnet. In the instant embodiment, the magnetic attraction device 84 is a bar-like electric magnet and the bar-like electric magnet is optionally mounted in the air drawing opening 822 of the air drawing device 82. Specifically, a rotatable bar-like electric magnet can be mounted in an air drawing opening of a conventional dry cleansing machine in such a way that two ends of the bar-like electric magnet are respectively and rotatably mounted to a chassis of the machine and an activation switch (not shown) is provided to activate or deactivate the bar-like electric magnet according to actual situations.

Step 6: the air drawing device 82 drawing air from the glass substrate to be cleansed 40 and the magnetic attraction device 84 generating a magnetic attraction force to the magnetic impurities on the glass substrate to be cleansed 40 so as to draw the impurities 42 attached to the glass substrate to be cleansed 40 into the suction device 80.

Referring to FIG. 4, the present invention further provides a glass substrate cleansing device, which comprises: a chassis (not shown), a transport platform 20 mounted on the chassis, two spaced air blowing devices 60 mounted on the chassis and located above the transport platform 20, and a suction device 80 mounted on the chassis. The suction device 80 comprises an air drawing device 82 and a magnetic attraction device 84. The air drawing device 82 comprises an air drawing opening 822 arranged between the two air blowing devices 60. The magnetic attraction device 84 is arranged in the air drawing opening 822 of the air drawing device 82.

Each of the air blowing devices 60 comprises an ultrasonic wave generator 62 mounted therein. The two ultrasonic wave generators 62 mounted in the two air blowing devices 60 emit ultrasonic waves that are inclined with respect to each other (as indicated by the arrows pointing to the glass substrate shown in FIG. 4) and converge on the glass substrate to be cleansed 40. The impurities 42 are subjected to vibration caused by ultrasonic-waved air flows from two directions and thus separated from the glass substrate 40. In the instant embodiment, the ultrasonic wave generators 62 operate at a frequency of 30 K-100 K Hz.

Specifically, each of the air blowing devices 60 comprises an air blowing opening 64 and two air blowing openings 64 of the two air blowing devices 60 are arranged to be inclined with respect each other so that the air flow directions of the two air blowing openings 64 (as indicated by the arrows pointing to the glass substrate shown in FIG. 4) define a predetermined included angle therebetween. The two air blowing devices 60 blows air flows through the air blowing openings 64 toward the glass substrate to be cleansed 40. The two ultrasonic wave generators 62 generate ultrasonic waves to have the air flows blown out of the air blowing openings 64 inducing vibration at the same vibration frequency as that of the ultrasonic waves. The vibrations are transmitted and applied to the impurities 42 to cause the impurities 42 to vibrate and separate from the glass substrate 40.

It is noted that the air drawing device 82 may further comprise an impurity storage section 824 that is in communication with the air drawing opening 822 and an air evacuation device (not shown) arranged at an end of the impurity storage section 824 that is distant from the air drawing opening 822. A separation screen (not shown) is arranged between the air evacuation device and the impurity storage section 824 to prevent the impurities from entering the air evacuation device to affect the service life of the air evacuation device.

The magnetic attraction device 84 can be a magnet or an electromagnet. In the instant embodiment, the magnetic attraction device 84 is a bar-like electric magnet and the bar-like electric magnet is optionally mounted in the air drawing opening 822 of the air drawing device 82. Specifically, a rotatable bar-like electric magnet can be mounted in an air drawing opening of a conventional dry cleansing machine in such a way that two ends of the bar-like electric magnet are respectively and rotatably mounted to a chassis of the machine and an activation switch (not shown) is provided to activate or deactivate the bar-like electric magnet according to actual situations.

In summary, the present invention provides a method for cleansing a glass substrate and a device for performing the method, wherein a magnetic attraction device is arranged in an air drawing opening of an air drawing device to operate collaboratively with the air drawing device to accomplish effective removal of magnetic impurities and thus overcome the drawback of the conventional cleansing device that is of inferior capability of removing magnetic impurities that are great weights from a glass substrate and avoid defects of a liquid crystal display panel that uses the glass substrate resulting therefrom, such as bright spots and bright lines so as to effectively improve the quality of the liquid crystal display panel.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A method for cleansing a glass substrate, comprising the following steps:
   (1) providing a transport platform and a glass substrate to be cleansed, the glass substrate to be cleansed having impurities attached thereto, the impurities comprising magnetic impurities and non-magnetic impurities;
   (2) placing the glass substrate to be cleansed on the transport platform;
   (3) providing two air blowing devices, the two air blowing devices being spaced from each other and arranged above the transport platform;
   (4) the two air blowing devices blowing air flows toward the glass substrate to be cleansed to have the impurities that are attached to the glass substrate to be cleansed to detach from the glass substrate;
   (5) providing a suction device, wherein the suction device comprises an air drawing device and a magnetic attraction device, the air drawing device comprising an air drawing opening arranged between the two air blowing devices, the magnetic attraction device being arranged inside the air drawing opening of the air drawing device; and
   (6) the air drawing device drawing air from the glass substrate to be cleansed by creating an airflow moving into and through the air drawing opening to carry the impurities entraining the airflow into the air drawing opening and the magnetic attraction device generating a magnetic attraction force inside the air drawing openings to attract the magnetic impurities from the glass substrate to be cleansed so as to draw the impurities attached to the glass substrate to be cleansed into the suction device.

2. The method for cleansing a glass substrate as claimed in claim 1, wherein each of the air blowing devices comprises an ultrasonic wave generator mounted therein, the two ultrasonic wave generators mounted in the two air blowing devices emitting ultrasonic waves that are inclined with respect to each other and converge on the glass substrate to be cleansed, the ultrasonic wave generators operating at a frequency of 30 K-100 K Hz.

3. The method for cleansing a glass substrate as claimed in claim 1, wherein the air drawing device comprises an impurity storage section that is in communication with the air drawing opening and an air evacuation device arranged at an end of the impurity storage section that is distant from the air drawing opening.

4. The method for cleansing a glass substrate as claimed in claim 3, wherein the air evacuation device and the impurity storage section comprise a separation screen arranged therebetween.

5. The method for cleansing a glass substrate as claimed in claim 1, wherein the magnetic attraction device comprises an electric magnet.

6. A glass substrate cleansing device, comprising: a transport platform, two spaced air blowing devices located above the transport platform, and a suction device comprising an air drawing device and a magnetic attraction device, the air drawing device comprising an air drawing opening arranged between the two air blowing devices, the magnetic attraction device being arranged inside the air drawing opening of the air drawing device.

7. The glass substrate cleansing device as claimed in claim 6, wherein each of the air blowing devices comprises an ultrasonic wave generator mounted therein, the two ultrasonic wave generators mounted in the two air blowing devices emitting ultrasonic waves that are inclined with respect to each other and converge on the glass substrate to be cleansed, the ultrasonic wave generators operating at a frequency of 30 K-100 K Hz.

8. The glass substrate cleansing device as claimed in claim 6, wherein the air drawing device comprises an impurity storage section that is in communication with the air drawing opening and an air evacuation device arranged at an end of the impurity storage section that is distant from the air drawing opening.

9. The glass substrate cleansing device as claimed in claim 8, wherein the air evacuation device and the impurity storage section comprise a separation screen arranged therebetween.

10. The glass substrate cleansing device as claimed in claim 6, wherein the magnetic attraction device comprises an electric magnet.

\* \* \* \* \*